(12) United States Patent
Matthies et al.

(10) Patent No.: US 11,287,787 B2
(45) Date of Patent: Mar. 29, 2022

(54) INPUT / OUTPUT SYSTEM

(71) Applicant: Phoenix Contact GmbH & Co. KG, Blomberg (DE)

(72) Inventors: Thorsten Matthies, Barntrup (DE); Rainer Esch, Blomberg (DE); Frank Mueller, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 17/061,588

(22) Filed: Oct. 2, 2020

(65) Prior Publication Data
US 2021/0103261 A1 Apr. 8, 2021

(30) Foreign Application Priority Data

Oct. 2, 2019 (LU) .......................................... 101427
Nov. 7, 2019 (DE) ...................... 10 2019 130 070.3

(51) Int. Cl.
*G06F 13/40* (2006.01)
*G05B 19/042* (2006.01)

(52) U.S. Cl.
CPC ..... *G05B 19/0423* (2013.01); *G06F 13/4027* (2013.01); *G05B 2219/21027* (2013.01); *G05B 2219/31135* (2013.01); *G05B 2219/33126* (2013.01)

(58) Field of Classification Search
CPC ..................... G06F 13/4027; G05B 19/0423
See application file for complete search history.

(56) References Cited

U.S. PATENT DOCUMENTS

| | | | | |
|---|---|---|---|---|
| 8,651,878 B2* | 2/2014 | Bjorklund | ......... | H02J 13/00016 |
| | | | | 439/76.1 |
| 10,314,194 B1* | 6/2019 | Chiang | ................ | H05K 7/1472 |
| 10,687,433 B1* | 6/2020 | Raic | ...................... | H05K 7/1468 |
| 10,963,412 B2* | 3/2021 | Karb | .................... | G06F 13/4081 |
| 2011/0254611 A1* | 10/2011 | Volkmann | ............ | G05B 19/048 |
| | | | | 327/365 |
| 2013/0111223 A1* | 5/2013 | Chang | .................... | H03M 1/186 |
| | | | | 713/300 |
| 2014/0115366 A1* | 4/2014 | Joo | ......................... | G06F 1/3287 |
| | | | | 713/323 |
| 2018/0092235 A1* | 3/2018 | Mielnik | ............... | H05K 7/1468 |
| 2021/0058449 A1* | 2/2021 | Bauer | ..................... | H04L 67/10 |

FOREIGN PATENT DOCUMENTS

EP 2035902 B1 11/2012
WO WO 2015049249 A2 4/2015

\* cited by examiner

*Primary Examiner* — Henry Tsai
*Assistant Examiner* — Christopher A Daley
(74) *Attorney, Agent, or Firm* — Leydig, Voit & Mayer, Ltd.

(57) ABSTRACT

An input/output system including: an input/output base unit which has a plurality of slots into which input/output modules are pluggable; an evaluation device; and at least one cover element which is arrangeable on one of the plurality of slots of the input/output base unit. The evaluation device detects a presence of the at least one cover element at a slot of the plurality of slots.

15 Claims, 14 Drawing Sheets

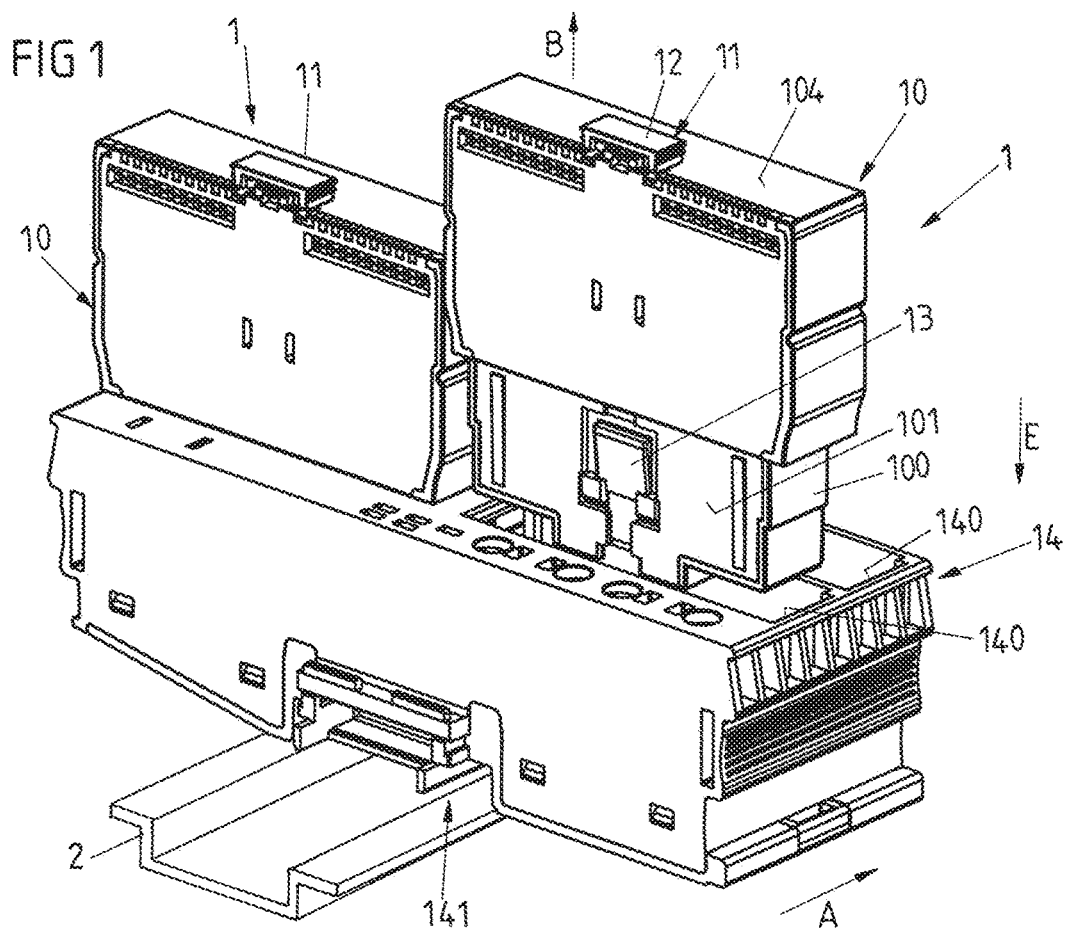
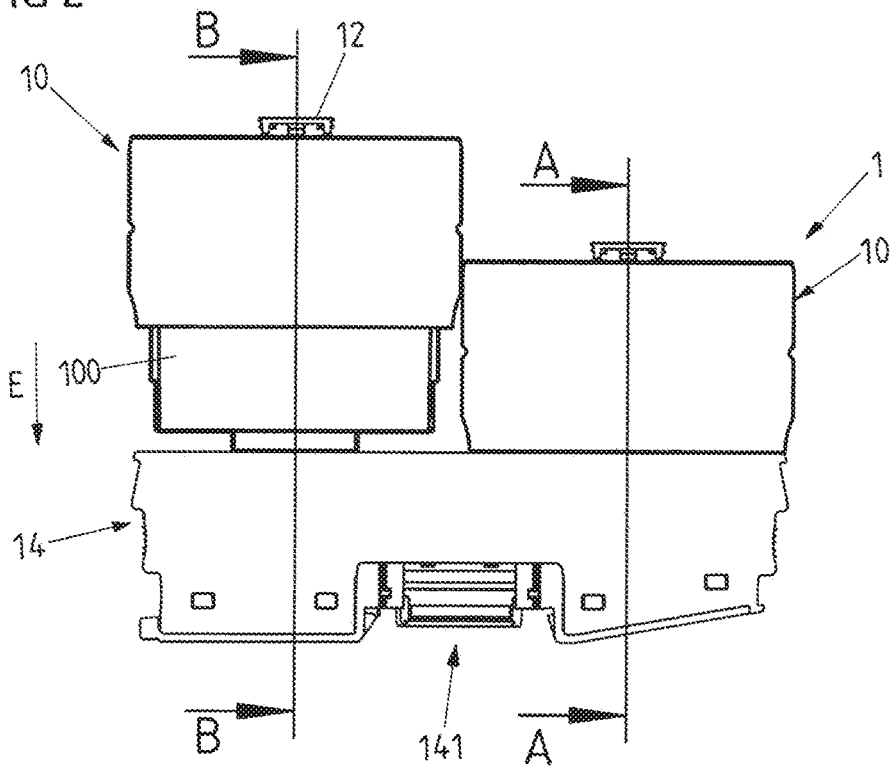

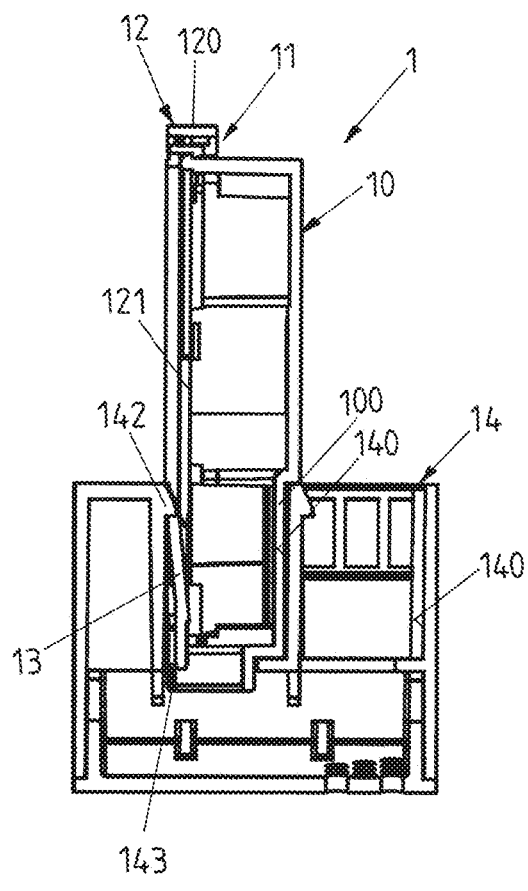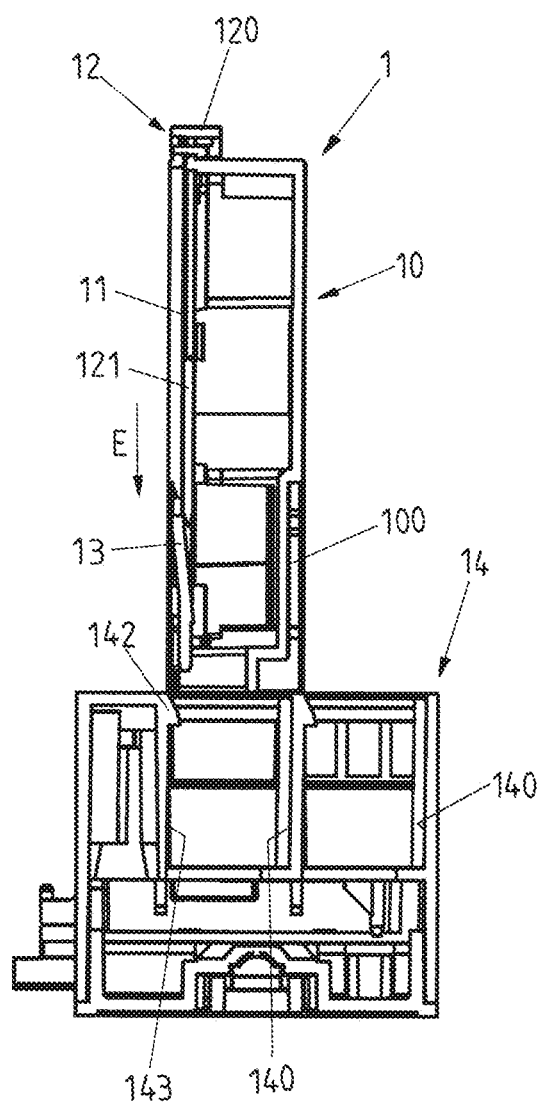

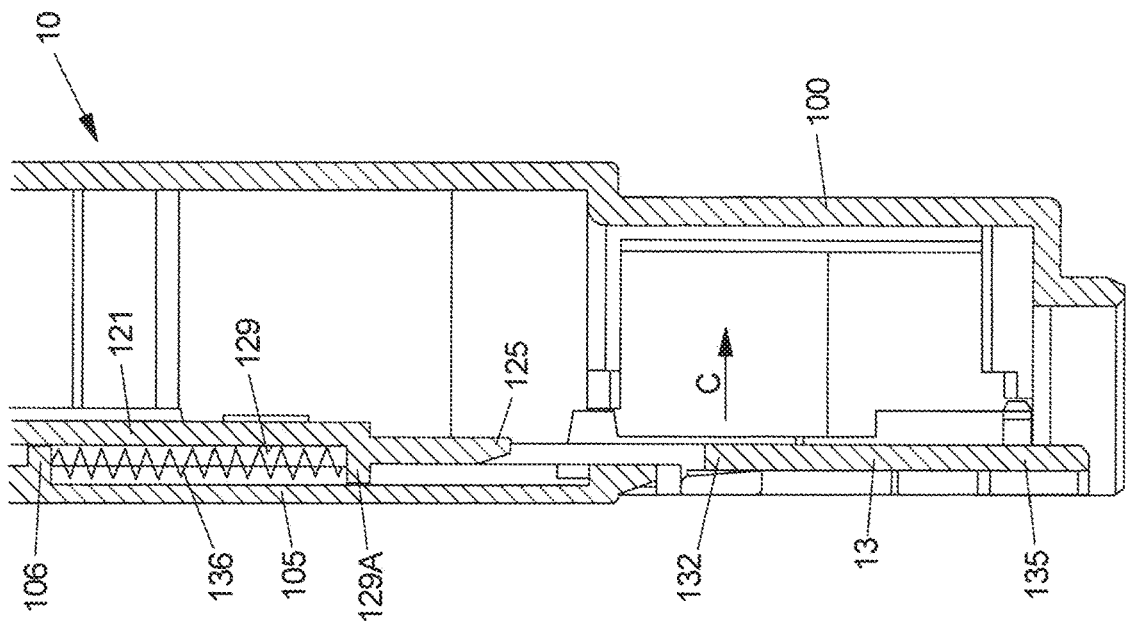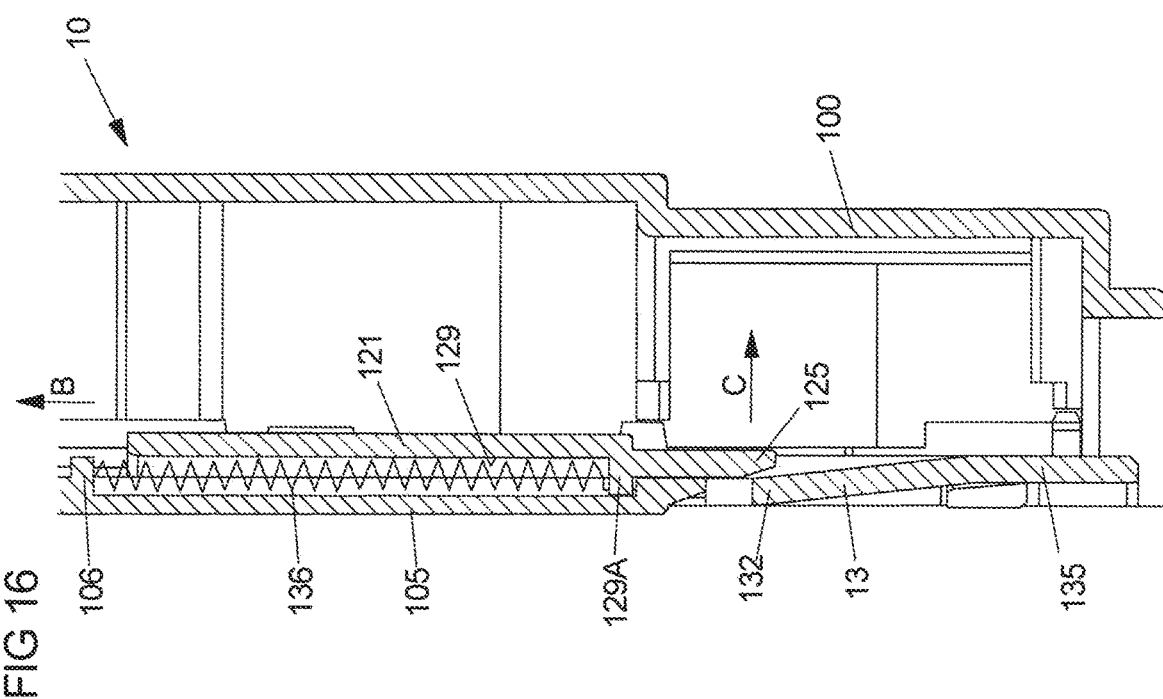

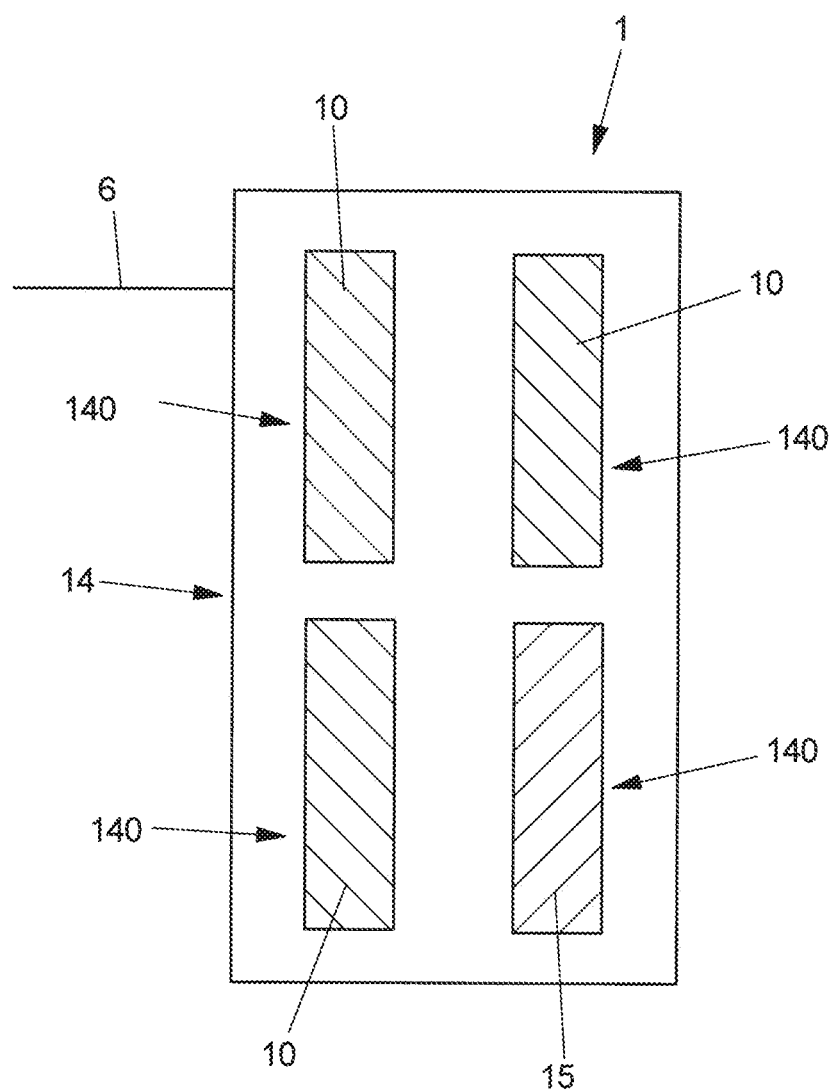

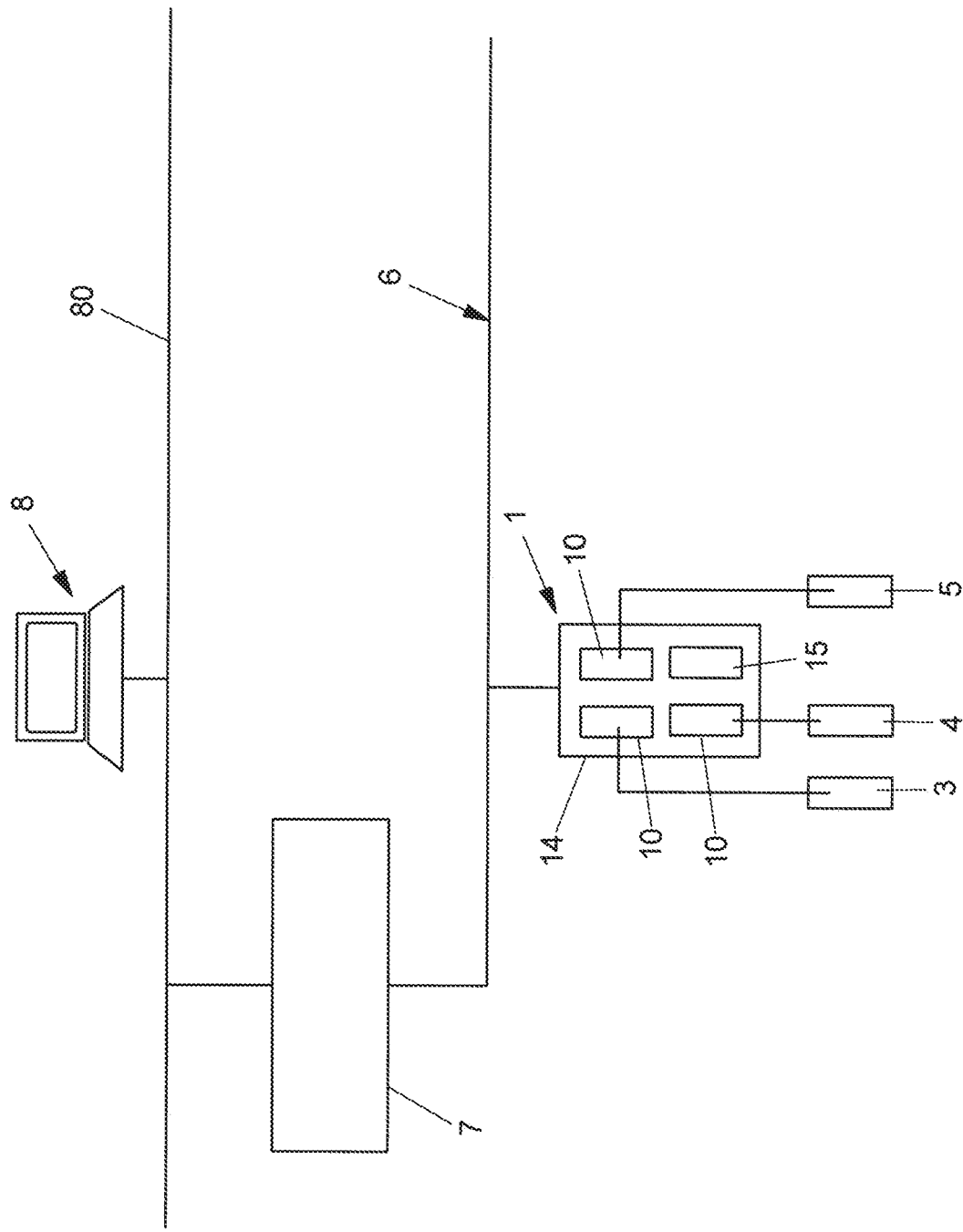

INPUT / OUTPUT SYSTEM

CROSS-REFERENCE TO PRIOR APPLICATION

Priority is claimed to German Patent Application No. 10 2019 130 070.3, filed on Nov. 7, 2019, and to Luxembourg Patent Application No. LU 101427, filed on Oct. 2, 2019. The entire disclosures of the foregoing applications are hereby incorporated by reference herein.

FIELD

The invention relates to an input/output system.

BACKGROUND

Such an input/output system, also referred to as an I/O system, can be used, for example, in the field of automation technology, for example in an industrial plant, for example on a production plant. Such an input/output system can be mounted, for example, in a switchgear cabinet and can be arranged for this purpose, for example, on a support rail inside a switchgear cabinet or on another fastening device. Such an input/output system can be connected, for example, to a fieldbus system in order to acquire data on machines and plants and to control machines and plants.

An input/output system of the type described here comprises an input/output base unit which has a plurality of slots into which input/output modules can be plugged. The input/output system also comprises an evaluation device, implemented, for example, by a bus coupler or by a decentralized controller. A bus coupler or a decentralized controller are implemented in a modular, i.e., flexibly assemblable, input/output system by separate components but are permanently integrated in a compact, that is to say non-expandable, input/output system.

An input/output base unit of this type can be modularly equipped with different input/output modules by providing a plurality of slots in order to thus provide different functions at the input/output base unit and to connect the input/output base unit to sensors or actuators for acquiring data or for controlling a machine or plant. The input/output system may be coupled to a bus system so that data can be exchanged with other devices by means of the input/output system; in particular, acquired data can be transmitted and control data for controlling a plant or machine can be received. For such a data exchange, the input/output system can have, for example, a so-called bus coupler by means of which the input/output system is coupled to a bus system in the form of a fieldbus for the purpose of data exchange.

Within the framework of the input/output system (also referred to as input/output station), a plurality of input/output base units can be combined with one another. In order to form the input/output system, input/output modules are connected to the input/output base unit, wherein such an input/output system may have a station head with a bus coupler arranged therein for providing a local bus for the communication connection between the input/output base units and the input/output modules connected thereto.

WO 2015/049249 A2 discloses a method for marking input and/or output channels of a fieldbus-addressable input and/or output device of an industrial automation system.

In a system known from EP 2 035 902 B1, virtual placeholders for distributed input and output modules can be configured in an industrial automation network.

An input/output base unit can basically be equipped with different combinations of modular input/output modules which are plugged into the slots of the input/output base unit for this purpose and are thereby mechanically and electrically connected to the input/output base unit. The configuration of the input/output base unit with input/output modules is usually predetermined, it also being possible for only some of the slots of the input/output base unit to be used, while other slots remain free. In such a case, in particular if a protection class is provided for the input/output system, for example IP20, for protection against moisture and dirt and possibly also ESD protection, care must be taken to ensure that moisture and dirt cannot readily penetrate into the input/output base unit via a free slot.

SUMMARY

In an embodiment, the present invention provides an input/output system, comprising: an input/output base unit which has a plurality of slots into which input/output modules are pluggable; an evaluation device; and at least one cover element which is arrangeable on one of the plurality of slots of the input/output base unit, wherein the evaluation device is configured to detect a presence of the at least one cover element at a slot of the plurality of slots.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 a view of an exemplary embodiment of an input/output system having an input/output base unit and input/output modules that can be connected to one another in a plugged manner;

FIG. 2 a side view of the arrangement according to FIG. 1;

FIG. 3 a sectional view along line A-A according to FIG. 2;

FIG. 4 a sectional view along line B-B according to FIG. 2;

FIG. 16 a sectional view of an exemplary embodiment, in which the actuating element is spring-biased by means of a spring element, in the locking position;

FIG. 17 a sectional view according to FIG. 16, with the actuating element in the actuated position;

FIG. 18 a schematic view of an input/output base unit with an arrangement of input/output modules attached thereto and a cover element;

FIG. 19 a schematic view of the input/output base unit on a bus system in the form of a fieldbus;

DETAILED DESCRIPTION

Figure 5:
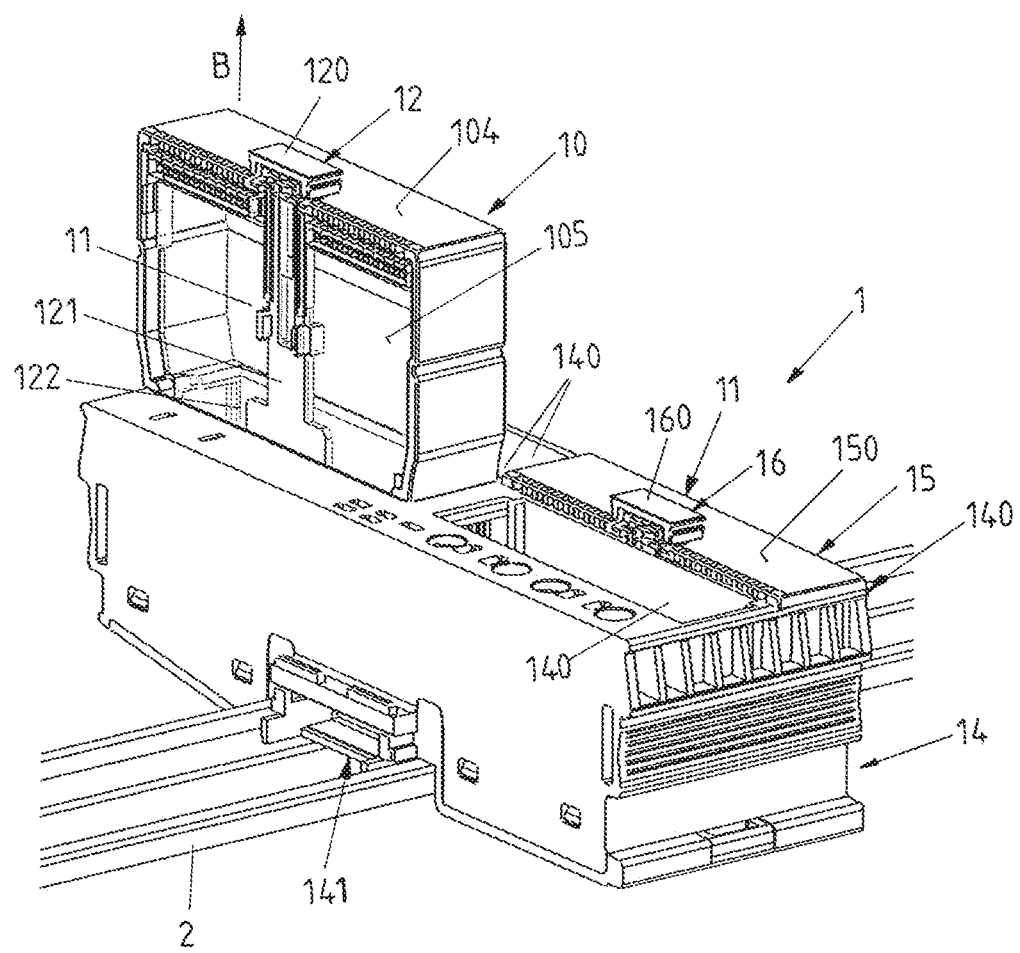
FIG. 5 another view of the input/output system, with an input/output module and a cover element in an attached position.

In an embodiment, the present invention provides an input/output system in which an input/output base unit can be operated variably with a combination of input/output modules, wherein, if necessary, individual slots of the input/output base unit are not equipped with input/output modules.

Accordingly, the input/output system has at least one cover element which can be arranged at one of the slots of the input/output base unit, the evaluation device being designed to detect a presence of the at least one cover element at a slot.

The cover element serves to cover a slot, which in the input/output base unit is, where applicable, not to be equipped with an input/output module, in such a way that penetration of moisture and dirt into the slot is prevented. In addition, the cover element can provide ESD protection. The cover element thus serves for outward protection and thus to cover toward the outside a slot which may remain open (i.e., a slot not equipped with an input/output module).

For this purpose, the cover element may have a planar element which extends over the respective slot in a planar manner when the cover element is attached to the input/output base unit. The cover element may have a seal, for example, so that a transition between the cover element and the slot is sealed and thus moisture and dirt cannot readily penetrate into the slot.

The evaluation device can be used to check, before start-up or during operation, whether a slot to which no input/output module is attached is closed with a cover element so that an intended operation of the input/output system is ensured. During start-up or repeatedly during operation, it can be checked in this case whether a slot is closed with a cover element so that during start-up or during operation, when the absence of a cover element is determined, a warning can be generated and a corresponding countermeasure can be initiated, for example by not starting the operation in the first place or by stopping it.

By means of the evaluation device of the input/output system, it can thus be determined automatically whether a cover element is present or not. The evaluation device is advantageously part of the input/output base unit but may also be designed to be external to the input/output base unit and be connected to the input/output base unit by means of a bus system, for example.

If the evaluation device is part of the input/output base unit, the evaluation device may be implemented, for example, by a bus interface (also referred to as a bus head) of a system bus of the input/output base unit or of the associated input/output system.

Alternatively, the evaluation device may be implemented by a decentralized controller and thus externally to the input/output base unit or the associated input/output system.

The cover element may, for example, be plugged into one of the slots of the input/output base unit. The cover element can thus be attached, for example like an input/output module that can be attached to the input/output base unit, to an associated slot of the input/output base unit and is connected in an attached position to the input/output base unit in a plugged manner.

In one embodiment, the input/output system has a detection device, wherein the evaluation device is designed to detect, in cooperation with the detection device, the presence of the at least one cover element at a slot. A detection as to whether a cover element has been attached as intended to a slot can take place in quite different ways, for example electrically, mechanically, optically or also magnetically. The detection device, which may in particular be part of the input/output base unit, can be designed correspondingly differently.

In one embodiment, such a detection device may be formed, for example, by a switch. If a cover element is attached to an associated slot as intended, the switch is actuated so that it can be detected on the basis of a switch position whether a cover element has been attached to a slot of the input/output base unit.

The actuation of such a switch can take place mechanically or also, for example, magnetically. For example, the cover element may have a magnetic element, in particular formed by a permanent magnet, which, when the cover element is attached to the input/output base unit, actuates a switch, for example in the form of a so-called reed switch, which can be evaluated and makes it possible to detect a presence of the cover element at the input/output base unit.

In another embodiment, the detection device can be formed by a light barrier. With such a light barrier, the presence of a cover element at a slot of the input/output base unit can be detected, for example by the cover element interrupting the light barrier in the attached position.

In yet another embodiment, the detection device can also be designed to detect an RFID tag arranged on the cover element or another tag. In this case, the detection device can be embodied, for example, as an RFID reader so that information stored in the RFID tag of the cover element can also be read and evaluated by means of the detection device.

On the one hand, the presence of the cover element at the input/output base unit can be checked and detected with such a detection device. Such a detection device can also be used, if appropriate, to check, by means of suitable mechanical, electrical, optical or magnetic detectors, whether a cover element is correctly arranged at an associated slot of the input/output base unit and is connected to the slot as intended, for example in a plugged manner.

In one embodiment, the cover element has an electrical device which makes it possible to detect whether or not the cover element is attached to an associated slot. By means of the electrical device, it can thus be checked before start-up or during operation whether a slot to which no input/output module is attached is closed with a cover element so that an intended operation of the input/output system is ensured.

The electrical device of the cover element can be implemented in various ways.

In one embodiment, the electrical device can be implemented, for example, by an electrical connection which implements a signal bridge. In this case, the electrical connection can electrically connect input/output modules, which are received in slots of the input/output base unit, to one another or to the input/output base unit. The electrical device of the cover element thus provides a bridging between input/output modules to one another or to the input/output base unit and thus closes a signal path at the input/output base unit. If a cover element is absent, such an electrical connection is correspondingly interrupted, which can be detected by signaling technology and can, for example, prevent operation of the input/output system.

In another embodiment, the electrical device of the cover element can be implemented by an electronic circuit which has, for example, a non-volatile memory. In such a non-volatile memory, which can be implemented, for example, by an EEPROM, identification information identifying the at least one cover element can, for example, be stored so that the cover element can be identified on the basis of the electronic circuit and it can thus be determined whether the cover element is attached to a slot as intended.

Identifying identification information in the form of a so-called device type code can be stored in such a non-volatile memory, for example. The identifying identification information can be read by means of the evaluation device, for example a bus head of the system bus of the input/output base unit, so that the cover element can be identified on the basis of the identification information stored in the non-volatile memory.

In one embodiment, the evaluation device is designed to check occupancy of the slots by input/output modules and the at least one cover element on the basis of configuration information.

The occupancy of an input/output base unit is usually defined by software so that the input/output base unit is configured and operated as intended. By means of the configuration, it can be specified, for example, which input/output modules are to be connected to the input/output base unit. Some input/output modules may be designed to detect, process, and forward sensor data from connected sensors. Other input/output modules may be designed, for example, for controlling actuators and thus configured for transmitting control commands. By means of the configuration information, it is specified, for example using planning and engineering software, which input/output modules are specifically connected to the input/output base unit so that the configuration information specifies what type the connected input/output modules are.

In this case, the configuration information also specifies when cover elements are present at one or more slots because these slots are not to be equipped with input/output modules. Each input/output module and also the cover element are in this case described, for example, by a device description file (e.g., GSDML for Profinet) and are correspondingly defined in the configuration information. If a cover element is not present at a slot, contrary to the definition in the configuration information, this can correspondingly be detected by the evaluation device.

The detection as to whether a cover element is present in accordance with predetermined configuration information can take place during start-up and also repeatedly during operation. For example, it can be queried cyclically during operation whether an input/output base unit is equipped according to the configuration information.

If an input/output module or a cover element is not present in accordance with the configuration information, a warning can be generated, for example, or the operation can be stopped or, upon detection at start-up, cannot be started in the first place. The generation of a warning is to be given priority, for example, if the availability of the system has high priority and the operation should thus not be interrupted readily. In contrast, stopping the system can be given priority if the presence of a cover element (and also of the input/output modules to be connected) has relevance to the safety of the system.

A warning may consist, for example, of an optical or acoustic alarm, for example the illumination of a warning light or the emission of a warning sound. However, a warning may also consist of warning information which is communicated to a higher-level control unit and is thus output in the form of an electronic message to an external control unit.

The input/output modules and also the cover element can be plugged into a respectively associated slot and, in the plugged-in position, are preferably electrically connected to the input/output base unit and are also mechanically held on the input/output base unit. For this purpose, the input/output modules and also the cover element can, for example, each have a locking device, wherein the locking device of each input/output module and of the cover element can be designed to have substantially the same function and serves for locking the respective component to the input/output base unit.

In one embodiment, such a locking device has an actuating element which can be adjusted along an actuating direction and a locking element which is operatively connected to the actuating element and is connected to a housing wall. The locking element is designed to, in the attached position, lock the at least one cover element to the input/output base unit. The locking element can be adjusted in relation to the housing wall by adjusting the actuating element in the actuating direction in relation to the housing wall in an unlocking direction directed transversely to the actuating direction in order to release the locking.

In the input/output system, a locking of the cover element to the input/output base unit in the attached position is produced by means of the locking device, which for this purpose has an actuating element arranged on the housing wall of the cover element and a locking element likewise arranged on the housing wall. The locking element serves to produce a locking in the attached position of the cover element in that the locking element establishes an operative connection between the cover element and the input/output base unit.

In this case, the locking element can preferably automatically assume a position on the housing wall of the cover element, which corresponds to a locking position so that when the cover element is attached to the input/output base unit, the locking element is automatically locked and thus, when attached, a connection is automatically established between the cover element and the input/output base unit.

The locking element can be unlocked by actuating the actuating element by moving the locking element on the housing wall in an unlocking direction directed transversely to the actuating direction when the actuating element is adjusted in the actuating direction. In this way, the locking between the cover element and the input/output base unit can be removed so that the cover element can be detached from the input/output base unit.

In one embodiment, the locking element is integrally formed with the housing wall. The locking element may be formed, for example, as a tab on the housing wall, the locking element preferably being elastically adjustable in relation to the housing wall. In an initial position, when the actuating element is not actuated, the locking element assumes a position in which the cover element can be locked to the input/output base unit by means of the locking element. When the cover element is attached to the input/ output base unit, the locking device thus locks automatically so that a secure and reliable connection is established between the cover element and the input/output base unit.

In one embodiment, the locking element in a locking position assumes a first position in relation to the housing wall and protrudes outward, for example, from the housing wall. By adjusting the actuating element, the locking element can be adjusted into an unlocked position in which the locking element is moved inward in relation to the locking position in the unlocking direction. In the locking position, in which the locking element can lock to the input/output base unit when the cover element is attached, the locking element assumes a position in relation to the housing wall such that the locking element can engage with an associated locking section on the input/output base unit when the cover element is attached to the input/output base unit, so that locking between the cover element and the input/output base unit can be established in this way. From the locking position, the locking element can be adjusted by actuating the actuating element, wherein, in the unlocked position, the locking element is adjusted inward in the direction of the housing interior of the cover element such that the locking connection between the cover element and the input/output base unit is removed. In this case, the locking element is adjusted on the housing wall in the unlocking direction directed transversely to the actuating direction.

In one embodiment, the actuating element is displaceably guided translationally, preferably linearly, but optionally also along a curved path, along the actuating direction on the housing wall of the cover element. For actuation, the actuating element can thus be displaced on the housing wall so that the locking element is thereby moved in relation to the housing wall and locking of the cover element to one another is removed.

In one embodiment, the actuating direction, in which the actuating element is movable for unlocking the cover element, is opposite a plug-in direction in which the cover element can be attached to the input/output base unit for connection. This makes it possible to release the locking and detach the cover element from the input/output base unit in a movement sequence in that, for releasing the locking, a user pulls, for example, on the actuating element in the actuating direction, thereby releasing the locking, and after releasing the locking, detaches the cover element from the input/output base unit in the actuating direction, i.e., opposite the plug-in direction. This facilitates handling for unlocking and for releasing the cover element, in particular also in that no separate movement sequences are required for releasing the locking and for separating the cover element from the input/output base unit.

The input/output base unit can, for example, be fastened to a support rail and for this purpose have a suitable fastening device for latching connection to the support rail, for example a so-called top-hat rail. The plug-in direction in which the cover element can be attached to the input/output base unit can in this case be directed in the direction of the support rail so that the cover element (and also the input/output modules) can be connected in a plug-in manner to the input/output base unit when the input/output base unit is connected to the support rail.

In one embodiment, the actuating element has at least one active section which is guided displaceably, in particular linearly displaceably, on at least one side edge of the locking element. For example, the actuating element can have two active sections which are guided, in particular linearly displaceably guided, on side edges extending parallel to one another, for example on mutually remote, outside edges of the locking element or on mutually facing edges of a slit of the locking element. The active sections can be formed, for example, as sliding sections which are slidably movable on the side edges and, upon actuation of the actuating element in the actuating direction, run onto the side edges such that the locking element is moved in the unlocking direction for unlocking the connection between the cover element and the input/output base unit. By means of the active sections, a force deflection of the movement of the locking element in the actuating direction into a movement of the locking element in the unlocking direction directed transversely to the actuating direction thus takes place in that the active sections run onto the side edges of the locking element when the actuating element is actuated and thereby adjust the locking element in the unlocking direction.

In one embodiment, the input/output base unit has a wall arranged at the slot and a latching section formed on the wall, for example in the form of a latching lug, with which the locking element is engaged for locking in the attached position of the cover element. When the cover element is attached to the input/output base unit, the locking element slides, for example, over the latching section and a sloped ramp formed therein so that when the cover element is connected in a plug-in manner, the locking element automatically engages with the latching section for locking. In the locking position, the locking element engages positively with the latching section so that the cover element is thereby secured to the input/output base unit against the plug-in direction. By actuating the actuating element, the locking element can be pulled and disengaged from the latching section in the unlocking direction directed transversely to the actuating direction so that the cover element can be released again from the input/output base unit.

An input/output system of the type described above can in particular assume an automation function, for example within the framework of an industrial plant or in the field of building automation. An input/output system of the type described can be mounted, for example, in a switchgear cabinet, wherein for this purpose, the input/output base unit can, for example, be fixed to a support rail so that the electrical device can be arranged as a whole on a support rail and, where applicable, be combined with further input/output systems.

However, it is also conceivable to use the electrical device independently of a support rail, for example by fixing the electrical device to a wall of a switchgear cabinet.

In an exemplary embodiment of an input/output system 1 shown in FIGS. 1 to 4, an input/output base unit 14 in the form of a housing base can be arranged on a support rail 2 by means of a fastening device 141 and can be combined with other input/output systems or other electrical devices, for example series terminals, on the support rail 2 along a lining-up direction A, for example, in order to in this way create an electrical functional module which can, for example, assume automation functions in the area of an industrial plant or of building automation.

The input/output base unit 14 constitutes a housing base which may be connected to a bus system as described below. In the illustrated exemplary embodiment, multiple slots are formed on the input/output base unit 14 in the form of plug-in openings 140 (four slots in the illustrated exemplary embodiment) into which modular input/output modules 10 may be plugged in order to mechanically and electrically connect the input/output modules 10 to the input/output base unit 14.

The input/output base unit 14, together with input/output modules 10 arranged thereon, is part of an input/output system (also referred to as an input/output station) to which can be connected a plurality of sensors and actuators. In order to form an input/output system, multiple input/output base units 14 can be combined with one another, wherein the input/output base units 14 for forming the input/output system are, for example, lined up adjacent to one another on a support rail and connected to one another by means of a local bus. In addition to the input/output base units 14, the input/output system may in this case have a station head which has a bus coupler.

As can be seen from FIGS. 18 and 19, the input/output base unit 14 can be connected, for example, (directly or by means of a bus coupler of a station head of an associated input/output system) to a bus system 6 in the form of a fieldbus so that the input/output modules 10 are connected to the bus system 6 by means of the input/output base unit 14 and data communication with a control device 7 and an external computer device 8 can thus take place by means of a network 80, for example.

The input/output modules 10 may each, for example, contain an electronic unit so that by attaching to the input/output base unit 14, various electrical and/or electronic functions may be provided at the input/output system 1 in a modular manner. For example, as schematically illustrated in FIG. 19, the input/output modules 10 can be used for receiving data from devices in the form of sensors 3, 4, 5 and/or for outputting control signals to devices in the form of actuators 3, 4, 5 and thus for acquiring data and for executing control functions on machines or plants in the area of an industrial plant.

The slots 140 of the input/output base unit 14 may each be equipped with an input/output module 10 by plugging an input/output module 10 into each slot 140. However, if a slot 140 is not to be equipped with an input/output module 10, a cover element 15 is arranged at a slot 140 remaining free, covers the respective slot 140 toward the outside and thus prevents moisture and dirt from penetrating into the slot 140 so that the input/output system can fulfill a protection class, for example IP20. In addition, the cover element 15 provides ESD protection (ESD stands for "electrostatic discharge").

Correspondingly, in the example according to FIGS. 18 and 19, input/output modules 10 are arranged at three slots 140, while at one slot 140 is provided a cover element 15, which thus covers this slot 140 toward the outside.

Which combination of input/output modules 10 and cover elements 15 is used on an input/output base unit 14 is usually specified in advance within the framework of configuration information which is created, for example, by means of planning and engineering software by a design computer 8 connected to the input/output base unit 14 by means of the fieldbus 6 and a control station 7. Within the framework of the planning and engineering software, each input/output module 10 and the cover element 15 are described by a device description file (e.g., GSDML in Profinet), wherein a respective configuration for an input/output base unit can be specified using the planning and engineering software and can be programmed within the framework of the configuration information.

While each input/output module 10 is designed to perform a function for inputting and/or outputting data, i.e., for example, for acquiring sensor data from connected sensors and/or for outputting control data to connected actuators, the cover element 15 does not assume any evaluation or control functions and also has no connections for connecting sensors or actuators. The cover element 15 serves as a passive element for covering a respectively associated slot 140 so that moisture and dirt can be prevented from penetrating into the slot 140.

Figure 20:
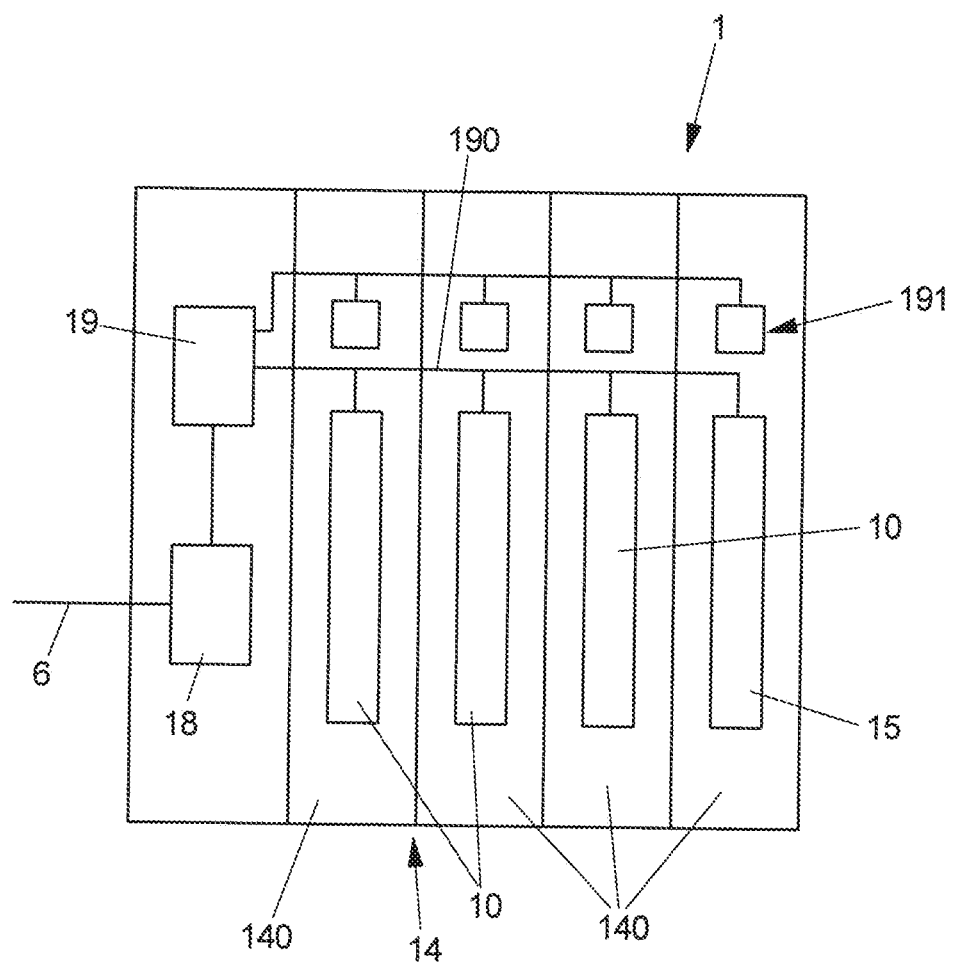
FIG. 20 a schematic view of the input/output base unit with attached input/output modules and a cover element.
Figure 21:
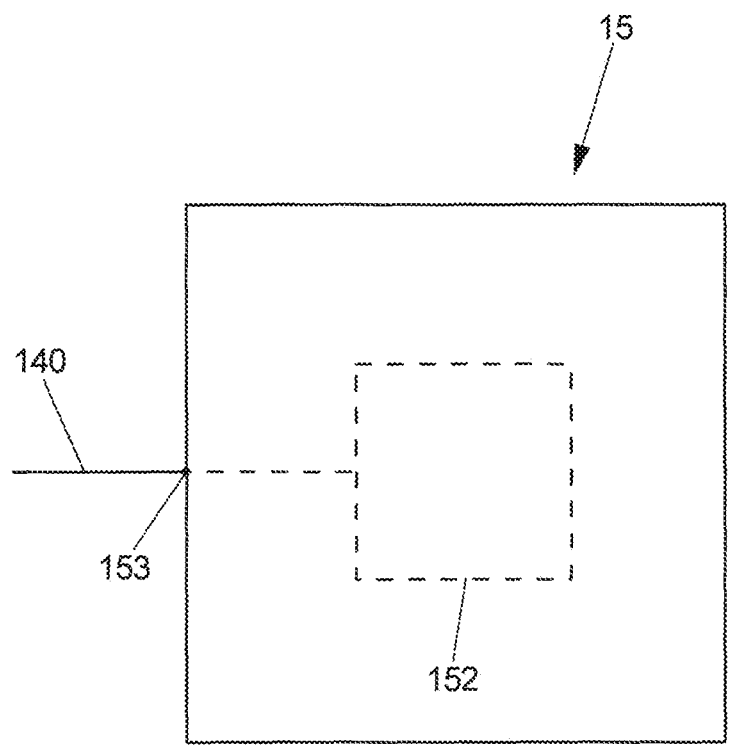
FIG. 21 a schematic view of a cover element with an electronic unit arranged thereon.

However, as can be seen from FIGS. 20 and 21, the cover element 15 has an electrical device 152 which, in the illustrated exemplary embodiment, is formed by an electronic unit having a non-volatile memory, for example in the form of an EEPROM, and in which identification information identifying the cover element 15 is stored. By means of a connection 153, the cover element 15 is connected, in a position attached to an associated slot 140, to an internal system bus 190 of the input/output base unit 14 and thereby to an evaluation device 19 in the form of a system bus interface (also referred to as a bus head) of the input/output base unit 14 which in turn is connected to a bus interface 18 and thereby to the bus system in the form of the fieldbus 6.

The bus head 19 can be part of the input/output base unit 14 but may also be part of a station head of a higher-level input/output system in the framework of which multiple input/output base units 14 are combined with one another.

By means of the electrical device 152 in the form of the electronic unit of the cover element 15, it can be determined whether or not a cover element 15 is attached to a slot 140 as intended. Depending on whether a cover element 15 has been attached correctly, an operation of the input/output system can thus be controlled, for example by generating a warning or preventing an operation of the input/output base unit 14 when the cover element 15 is missing.

An identifier in the form of identification information identifying the cover element 15, for example in the form of a so-called device type code, can, for example, be stored in the electrical device 152 in the form of the electronic unit. During start-up of the input/output base unit 14 and/or cyclically during operation, it can be queried whether a cover element 15 is located as intended at an associated slot 140 which is defined on the basis of the configuration information programmed in advance. If this is not the case, a warning can be generated or the operation of the input/output base unit 14 can be modified, for example by stopping the operation.

In this case, a warning can be output, for example, via the bus system 6 to the control station 7 so that an operation of a higher-level overall system can also be adapted, for example by stopping the operation of the overall system until the fault is corrected.

In addition to or as an alternative to a detection of the cover element 15 at an associated slot 140 of the of input/output base unit 14, detection may also take place by means of a detection device 191 as shown schematically in FIG. 20. Such a detection device 191 is connected, for example, to the bus head 19 of the input/output base unit 14 or of a station head of the input/output system. Such a detection device 191 can be implemented, for example, for mechanical, optical, magnetic or electrical detection of a presence of a cover element 15 at an associated slot 140 of an input/output base unit 14.

For example, such a detection device 191 can be implemented by a switch which can be actuated mechanically or magnetically by means of a magnetic element arranged on the cover element 15 and whose switch position can be evaluated in order to detect the presence of a cover element 15 at a slot 140.

Alternatively, such a detection device 191 can be implemented, for example, by an optical light barrier so that the presence of the cover element 15 at the slot 140 can be detected on the basis of the interruption of the light barrier by a cover element 15 attached to a slot 140.

As another alternative, the detection device 191 can also be formed by a reader, for example an RFID reader, for communicating with an RFID tag of the cover element 15.

The input/output modules 10 can in each case, like the cover element 15, be plugged into a respectively associated slot 140 and, when plugged in, are connected on the one hand mechanically to the input/output base unit 14 and are also electrically connected to the input/output base unit 14.

The input/output modules 10 each have a plug-in section 100 with which the respective input/output module 10 can be plugged into an associated plug-in opening 140 on the input/output base unit 14 along a plug-in direction E in order to connect the input/output module 10 to the input/output base unit 14 in this way.

Figure 6:
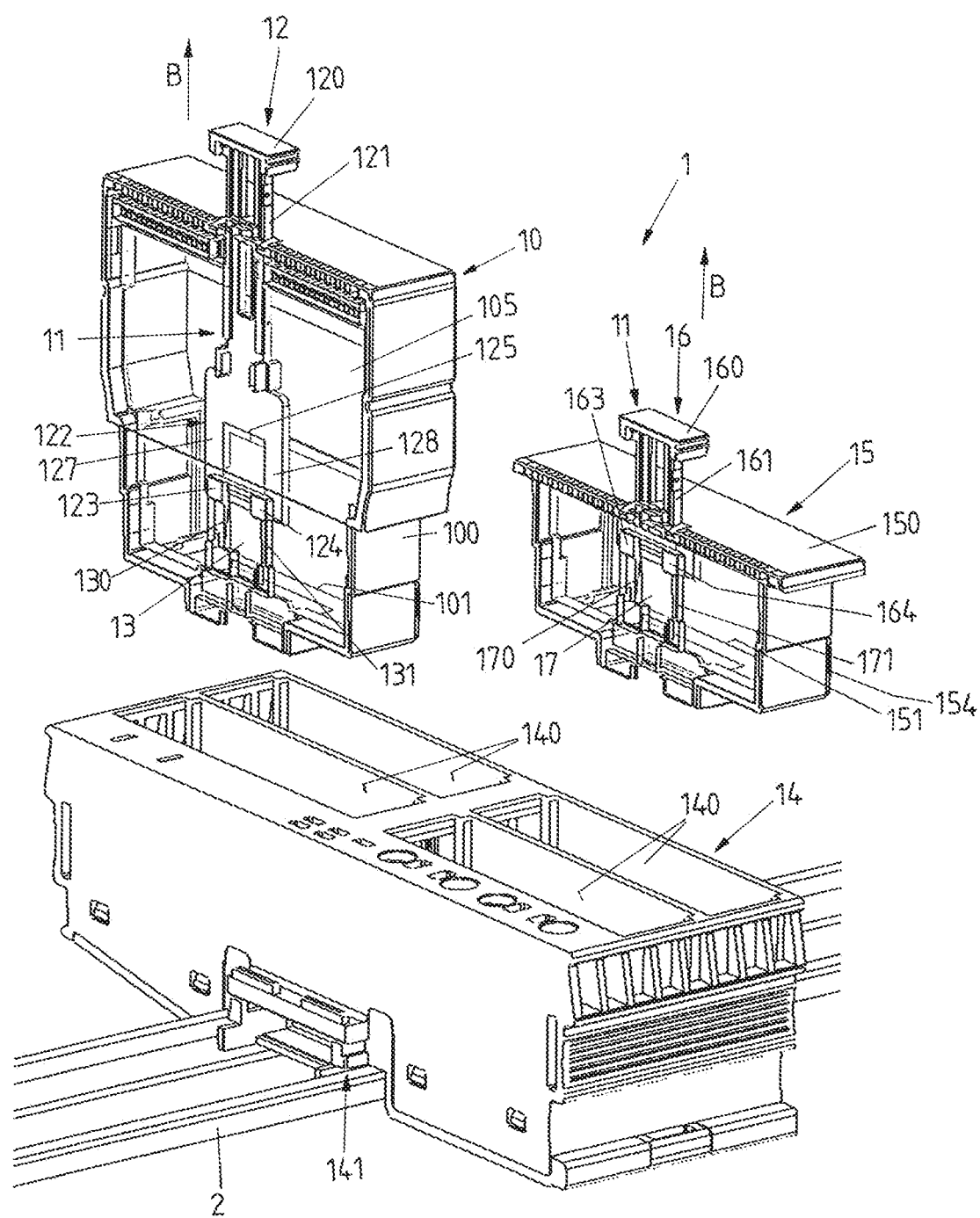
FIG. 6 a view of the arrangement according to FIG. 5, with separate input/output module and separate cover element.
Figure 7:
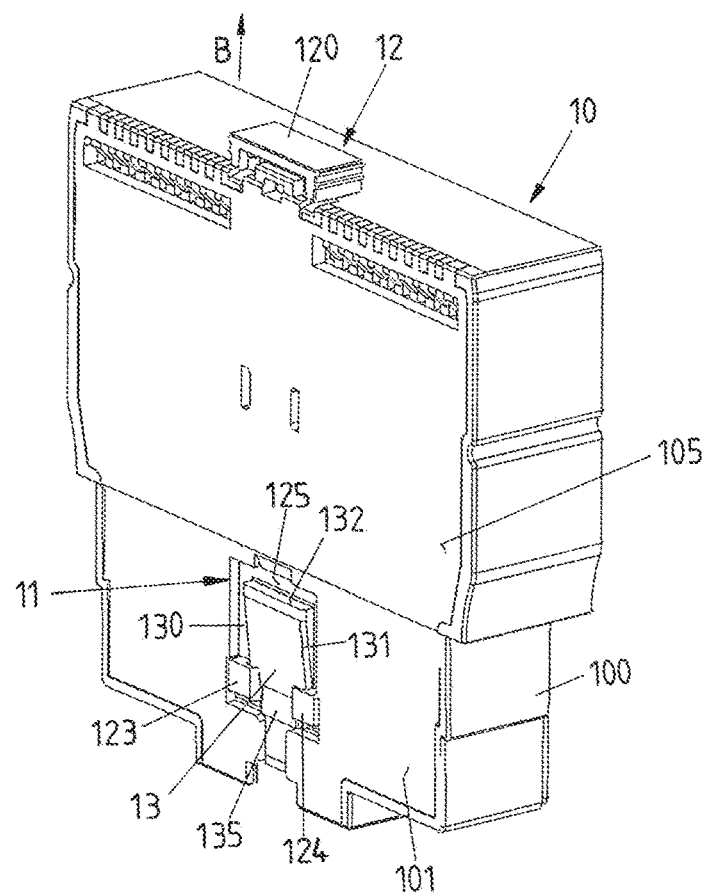
FIG. 7 a separate view of an input/output module.
Figure 8:
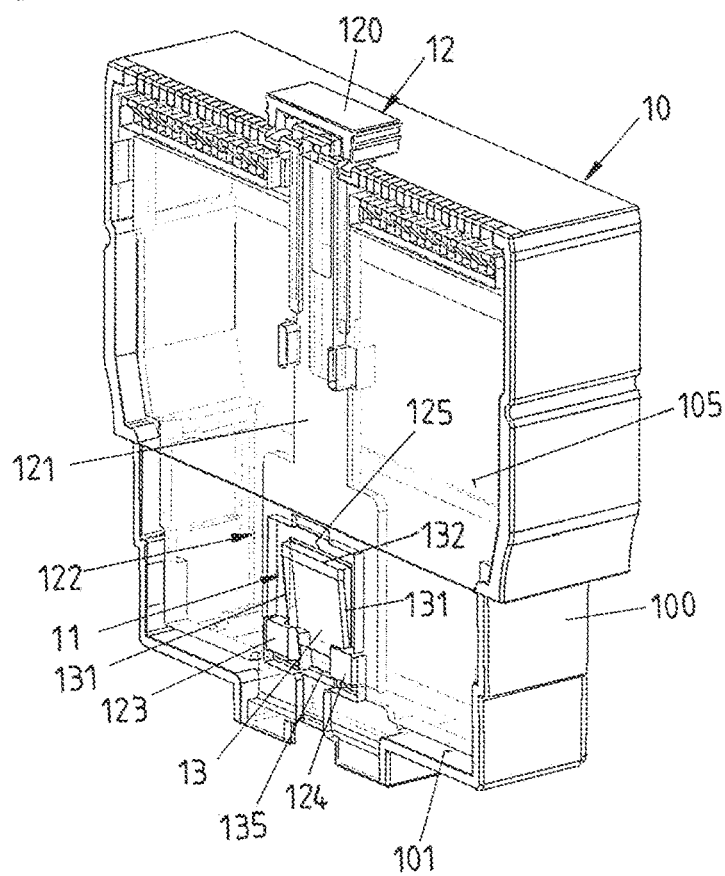
FIG. 8 a partially transparent view of the input/output module according to FIG. 7.
Figure 9:
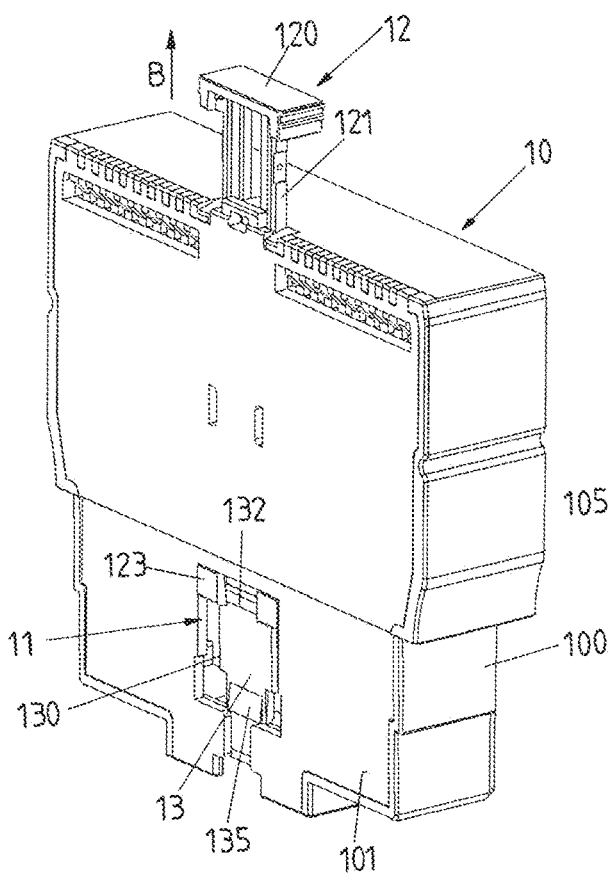
FIG. 9 a view of the input/output module according to FIG. 7, with an actuating element in an actuated position.
Figure 10:
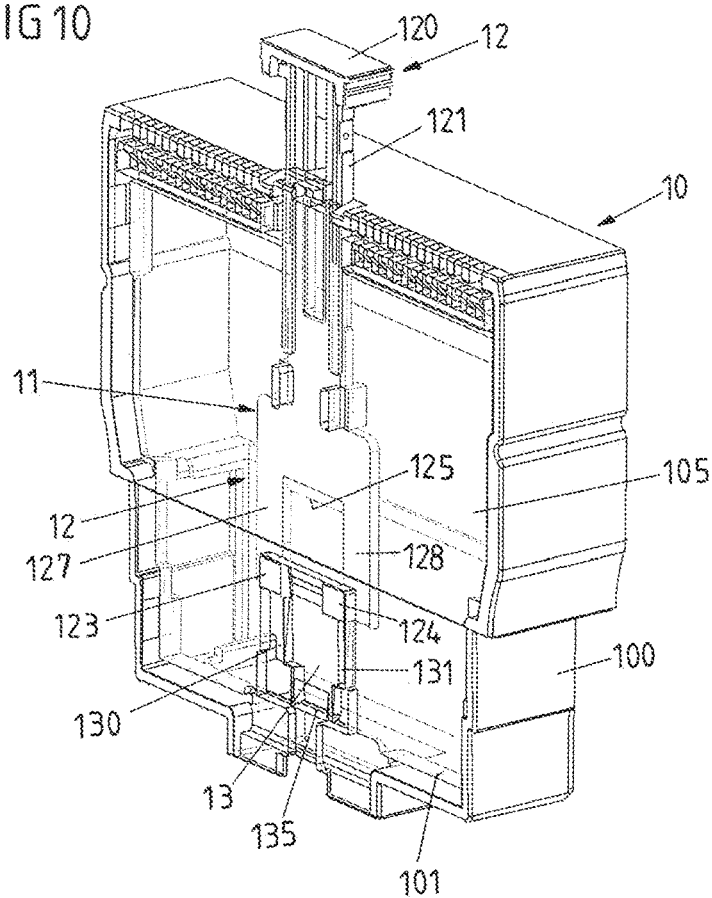
FIG. 10 a partially transparent view of the input/output module according to FIG. 9.

As can be seen from FIG. 6, the cover element 15 also has a plug-in section 154 with which the cover element 15 can be plugged into a respectively associated slot 140. If the cover element 15 is plugged into the associated slot 140, a planar element 150 formed on the face side of the cover element 15 conceals, as can be seen from FIG. 5, the associated slot 140 in such a way that moisture and dirt cannot readily reach the area of the slot 140 from the outside.

Each input/output module 10, like the cover element 15, has a locking device 11 which is used to lock the input/output module 10 or the cover element 15 in a position attached to the input/output base unit 14 to the input/output base unit 14 in such a way that the input/output module 10 or the cover element 15 is fixed positively against the plug-in direction E in relation to the input/output base unit 14 and is thus mechanically held on the input/output base unit 14. The locking is releasable in order to detach the input/output module 10 or the cover element 15 from the input/output base unit 14 against the plug-in direction E.

Hereinafter, the function of the locking device 11 is explained with respect to an input/output module 10 with reference to FIGS. 7 to 17. The locking device 11 of the cover element 15 is, however, functionally identical to the locking device 11 of the input/output module 10 so that the following essentially identically also serves as the cover element 15 unless otherwise explained.

In order to form the locking device 11, a locking element 13 is arranged on the input/output module 10, is formed in one piece and integrally with a housing wall 101 of the input/output module 10 and is operatively connected to an actuating element 12 that can be displaced along an actuating direction B in relation to the housing wall 101.

The actuating element 12 has an actuating head 120 which is arranged in the region of a head side 104 of the respectively associated input/output module 10 facing away from the plug-in section 100, as can be seen, for example, from FIG. 5. The head 120 is formed on a shaft section 121 which, at an end remote from the head 120, forms a foot section 122 formed by legs 127, 128 and active sections 123, 124 formed on the legs, as can be seen, for example, from FIG. 11.

The actuating element 12 is guided in a linearly displaceable manner along the actuating direction B on the housing wall 101 which is implemented by a housing part 105 of the input/output module 10 to be connected to a housing box. The actuating element 12 is operatively connected by means of the active sections 123, 124 of the foot section 122 to the locking element 13 which is formed in the region of the plug-in section 100 on the housing wall 101, is, as can be seen from FIG. 11, integrally formed with the housing wall 101, is connected for this purpose at a connected end 135 to the housing wall 101 and, with an end edge 132, is remote from the connected end 135. The locking element 13 is arranged within a recess 103 of the housing wall 101 and is elastically adjustable within the opening 103 in relation to the housing wall 101.

As can be seen from FIGS. 7, 8 and FIGS. 9, 10, the active sections 123, 124 of the actuating element 12 slide on side edges 130, 131 of the locking element 13. At lower ends of the side edges 130, 131 facing the connected end 135, recesses 133, 134 are in this case formed on the locking element 13 and enable mounting of the actuating element 12 while establishing the operative connection between the active sections 123, 124 and the locking element 13.

Figure 12:
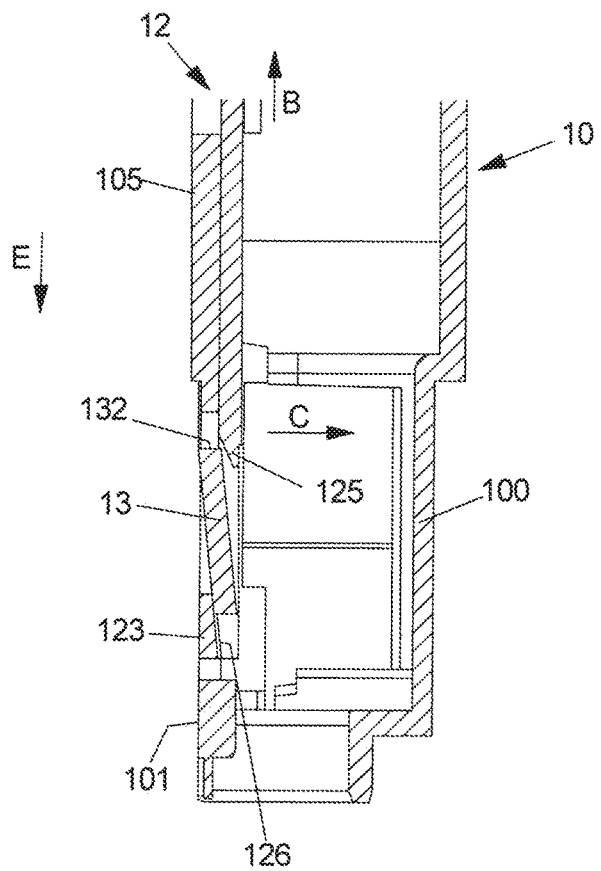
FIG. 12 a sectional view along line A-A according to FIG. 11, in a locking position.
Figure 13:
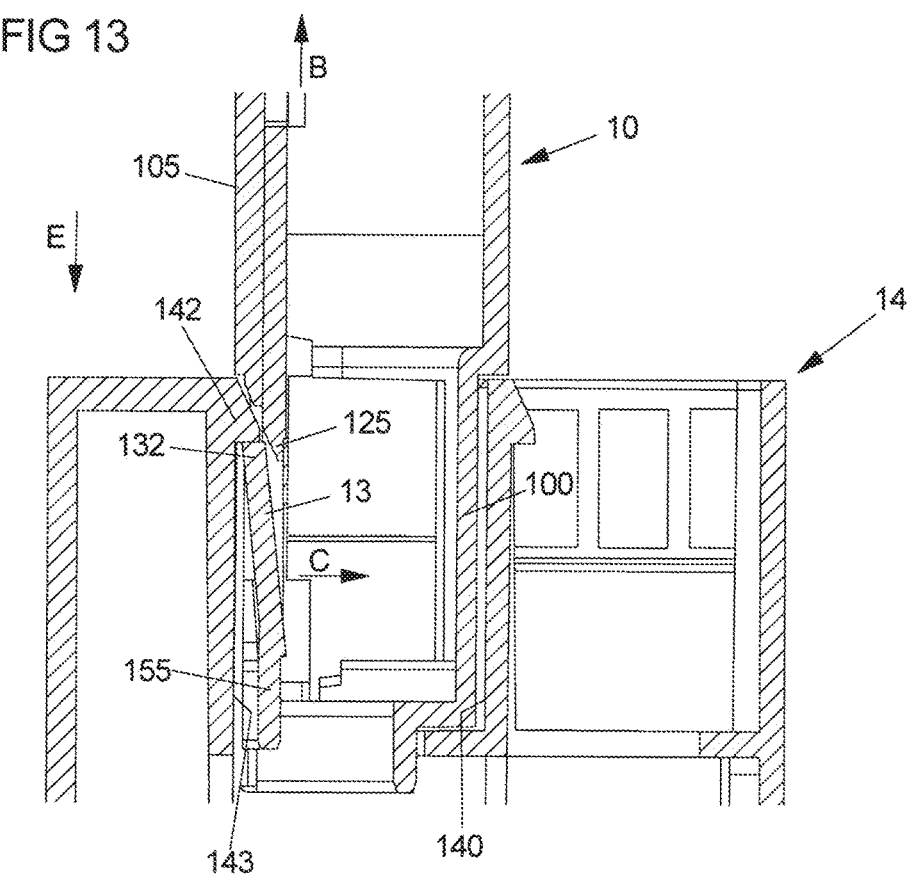
FIG. 13 a sectional view along line B-B according to FIG. 11, in the locking position.
Figure 14:
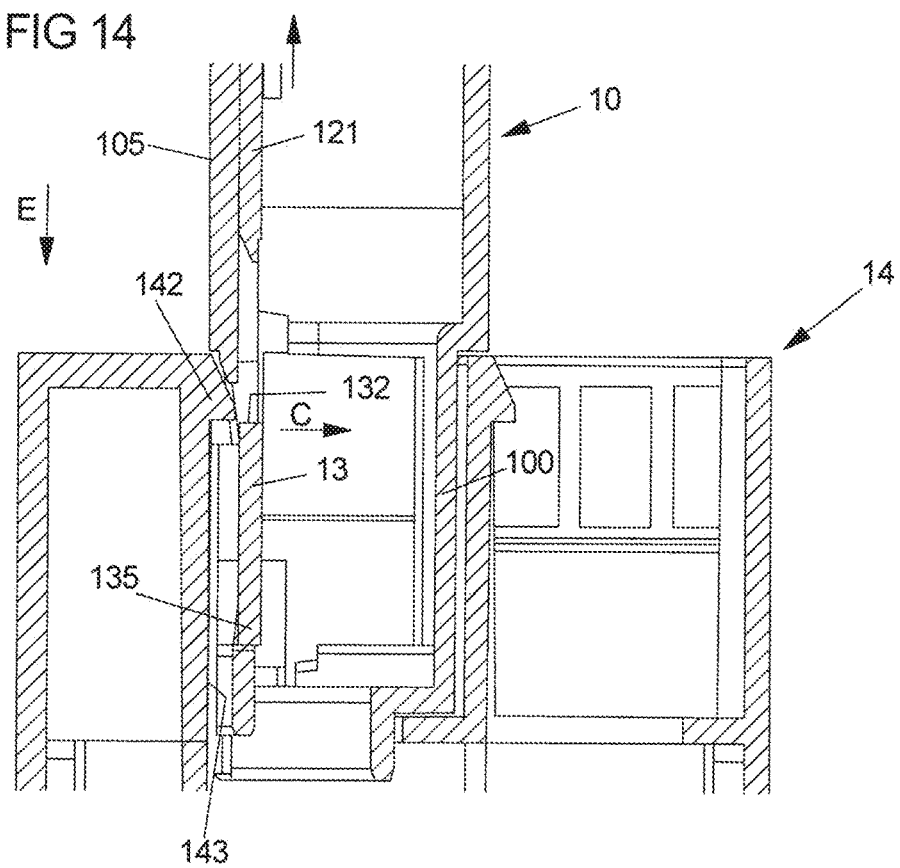
FIG. 14 a sectional view along line B-B according to FIG. 11, with the actuating element in an actuated position.
Figure 15:
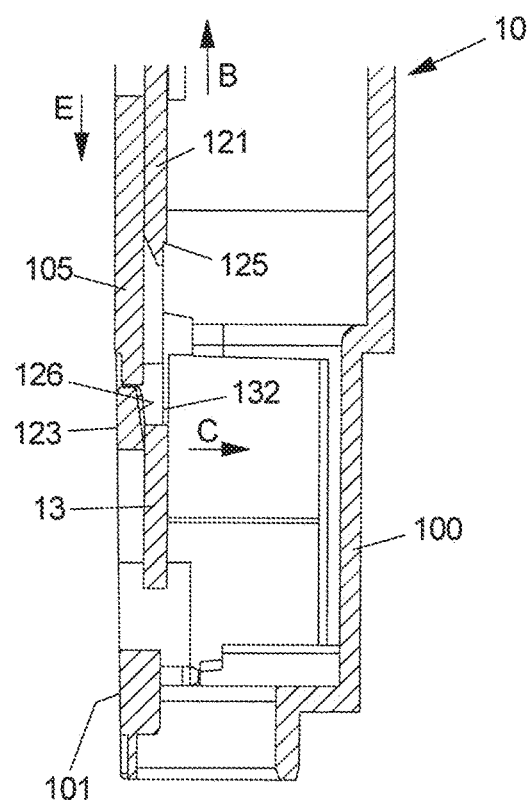
FIG. 15 a sectional view along line A-A according to FIG. 11, with the actuating element in the actuated position.

As can be seen from the sectional views according to FIGS. 12 and 13, the locking element 13 is positioned obliquely to the housing wall 101 in a locking position and its free end edge 132 points outward. In the locking position, the locking element 13 can establish locking to a latching section 142 on a wall 143 within the plug-in opening 140 of the input/output base unit 14 in that when the input/output module 10 is plugged into an associated plug-in opening 140 of the input/output base unit 14 in the plug-in direction E, the locking element 13 runs onto the latching section 142 and after passing the latching section 142 engages with the latching section 142, as can be seen in particular from FIG. 13. In the locking position, a positive connection between the input/output modules 10, 14 is thus established when the input/output modules 10, 14 are attached to one another so that the input/output modules 10, 14 are fixed to one another against the plug-in direction E.

Figure 11:
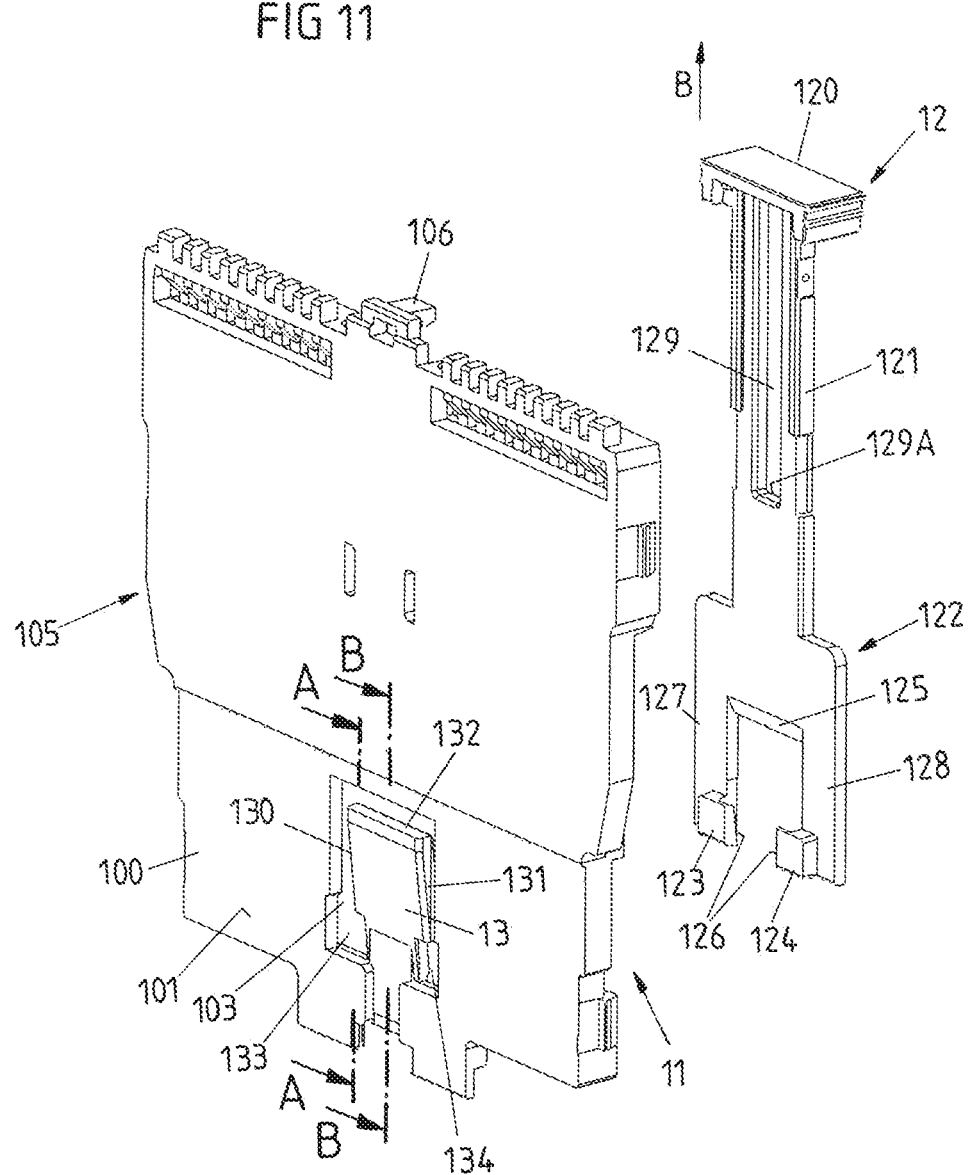
FIG. 11 a separate view of a housing wall and the actuating element arranged thereon.

As can be seen from FIGS. 12 and 13 in conjunction with FIG. 11, the actuating element 12 forms, at the foot section 122 between the legs 127, 128, a blocking section 125 which engages under the locking element 13 in the locking position of the actuating element 12 such that the locking element 13 is blocked in an unlocking direction C. The blocking section 125 comes to lie behind the end edge 132 of the locking frame 13 in the unlocking direction C so that the actuating element 12 supports the locking element 13 against the unlocking direction C and thus holds it in the locking position.

A bevel which is directed obliquely to the actuating direction B and to the unlocking direction C is formed on the blocking section 125. Using the bevel, the blocking section 125 can run onto the end edge 132 when the actuating element 12 is adjusted into the locking position so that support of the blocking section 125 toward the end edge 132 of the locking element 13 can be provided thereby.

By actuating the actuating element 12 in the actuating direction B, the locking element 13 can be unlocked. When actuating the actuating element 12, the active sections 123, 124 glide with a bevel 126 each formed on the inside of the respective active section 123, 124 (see FIG. 11) on the side edges 130, 131 of the locking element 13 and thereby elastically adjust the locking element 13 inward in relation to the housing wall 101 in the unlocking direction C, as can be seen in the transition from FIGS. 12, 13 to FIGS. 14, 15. As can be seen from FIG. 14, the end edge 132 of the locking element 13 is thereby disengaged from the latching section 142 on the wall 143 of the input/output base unit 14 so that the input/output modules 10, 14 can be detached from one another against the plug-in direction E.

The actuating direction B in which the actuating element 12 is to be actuated for unlocking the locking device 11 is opposite the plug-in direction E. For actuating the actuating element 12, a user can, for example, pull the head 120 of the actuating element 12 in order to in this way displace the actuating element 12 in the actuating direction B on the input/output module 10. The input/output module 10 is then detached from the input/output base unit 14 in the actuating direction B so that the actuation of the actuating element 12 and the removal of the input/output module 10 from the input/output base unit 14 can take place in one movement sequence and thus in one work step.

As shown in one exemplary embodiment in FIGS. 16 and 17, the actuating element 12 can be spring-biased to the input/output module 10 by means of a spring element 136. For this purpose, the spring element 136 can be received, for example, in a recess 129 in the form of a receiving groove on the shaft section 121 of the actuating element 12 and with one end on a base 129A of the recess 129 at the transition to the foot section 122 and with the other end on a support section 106 which is formed on the housing part 105 and engages as a projection in the recess 129 in the form of the receiving groove.

In the exemplary embodiment shown, the spring element 136 is designed as a compression spring and biases the actuating element 12 in the direction of the locking position (FIG. 16). When the actuating element 12 is adjusted for unlocking in the actuating direction B, the spring element 136 is stretched under pressure (FIG. 17) due to a change in distance between the base 129A of the recess 129 and the support section 106 on the housing part 105 along the actuating direction B. The tension on the spring element 136 causes the actuating element 12 to be automatically returned to the locking position (FIG. 16) against the actuating direction B after actuation took place.

This makes it possible for the actuating element 12 to automatically return to its initial position associated with the locking position of the locking element 13 after actuation took place, i.e., the actuating element 12 to be returned again against the actuating direction B after actuation took place.

Such a spring element 136 may be advantageous for simplified operation. However, such a spring element 136 may also be dispensed with. When the input/output module 10 is attached to the input/output base unit 14 in the plug-in direction E and if the actuating element 12 is not in its initial position associated with the locking position of the locking element 13, a user usually presses the head 120 of the actuating element 12 and thus brings the actuating element 12 into the position associated with the locking position of the locking element 13.

The housing wall 101 of the input/output module 10 and the wall 143 within the plug-in opening 140 of the input/output base unit 14 can have an elasticity transverse to the actuating direction B such that the input/output module 10 can be attached in the plug-in direction E to the input/output base unit 14 even when the actuating element 12 is not actuated. In particular, the housing wall 101 can be formed in such a way that the locking element 13 can escape when the actuating element 12 is in the initial position according to FIGS. 12 and 13 such that the locking element 13 can be moved past the latching section 142 until the locking element 13 engages with the latching section 142.

The locking device 11 of the cover element 15 is also formed by an actuating element 16 guided displaceably on a housing wall 151 of the plug-in section 154 of the cover element 15 and by a locking element 17 formed integrally and in one piece with the housing wall 151 in the form of a tab. In this case, the actuating element 16 and the locking element 17 are functionally identical to the actuating element 12 and the locking element 13 of the input/output module 10 as explained above. In the locking device 11 of the cover element 15, active sections 163, 164 are also formed on the actuating element 16, are connected by means of a shaft section 161 to a head 160 of the actuating element 16 and are guided slidingly on lateral edges 170, 171 of the locking element 17. By adjusting the actuating element 16 along the actuating direction B, the locking element 17 can be adjusted between an outward adjusted, locked position corresponding to the position according to FIGS. 12 and 13 into an inwardly offset, unlocked position corresponding to the position according to FIGS. 14 and 15 in order to unlock the cover element 15.

A structural difference between the locking device 11 of the cover element 15 and the locking device 11 of the input/output module 10 results from the different heights of the cover element 15 on the one hand and of the input/output module 10 on the other hand. As a result, the actuating element 16 of the cover element 15 is shorter, as can be seen in particular from FIG. 6, wherein the active sections 163, 164 in the cover element 15 are also connected to the shaft section 161 and thereby to the head 160 so that by adjusting the actuating element 16 by engaging the head 160, the active sections 163, 164 can be adjusted in relation to the locking element 17 in order to unlock the cover element 15.

The idea behind the invention is not limited to the exemplary embodiments described above but can also be implemented in another manner.

Any number of slots may be provided on an input/output base unit. In particular, the number of slots may deviate from four. For example, 2, 3, 4, 5, 6, 7, 8 or even more slots may be provided on an input/output base unit.

Input/output modules and cover elements may be used with one another in any combination. In this case, the cover elements serve to cover free slots, i.e., slots which are not equipped with an input/output module.

An electrical device on a cover element is not necessarily implemented by an electronic unit. It is also conceivable, for example, to implement the electrical device by means of an electrically conductive bridging section, which electrically connects input/output modules to one another or to a system bus of the input/output base unit so that an electrical connection is interrupted in the absence of a cover element, which can be detected accordingly or leads directly to a malfunction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Input/output system
10 Input/output module
100 Plug-in section
101, 102 Wall
103 Opening
104 Head side
105 Housing part
106 Support section
11 Locking device
12 Actuating element
120 Head
121 Shaft section
122 Foot section
123, 124 Active section
125 Blocking section
126 Bevel
127, 128 Leg
129 Recess (receiving groove)
129A Base
13 Locking element
130, 131 Side edge
132 End edge
133, 134 Recess
135 Connected end
136 Spring element
14 Input/output base unit
140 Slot
141 Fastening device
142 Latching section
143 Wall
15 Cover element
150 Planar element
151 Wall
152 Electrical device (electronic unit)
153 Connection
154 Plug-in section
16 Actuating element
160 Head
161 Shaft section
163, 164 Active section
17 Locking element
170, 171 Side edge
18 Bus interface
19 Evaluation device (system bus interface)
190 System bus
191 Detection device
2 Support rail
3, 4, 5 Device (sensor or actuator)
6 Bus system (fieldbus)
7 Control station
8 Design computer
80 Network
A Lining-up direction
B Actuating direction
C Unlocking direction
E Plug-in direction

The invention claimed is:

1. An input/output system, comprising:
an input/output base unit which has a plurality of slots into which input/output modules are pluggable;
an evaluation device; and
at least one cover element which is arrangeable on one of the plurality of slots of the input/output base unit,
wherein the at least one cover element has an electrical device,
wherein the evaluation device is configured to detect, in cooperation with the electrical device of the at least one cover element, a presence of the at least one cover element at a slot of the plurality of slots in which an input/output module is not plugged,
wherein the electrical device comprises an electronic circuit, wherein the electronic circuit has a non-volatile memory, wherein identification information identifying the at least one cover element is stored in the non-volatile memory.

2. The input/output system according to claim 1, wherein the at least one cover element is pluggable into one of the plurality of slots of the input/output base unit.

3. The input/output system according to claim 1, further comprising a detection device,
wherein the evaluation device is configured to detect, in cooperation with the detection device, the presence of the at least one cover element at the slot of the plurality of slots.

4. The input/output system according to claim 1, wherein the electrical device comprises a signal bridge configured to close, in a position of the cover element attached to the slot, an electrical path at the input/output base unit.

5. The input/output system according to claim 1, wherein the non-volatile memory comprises an EEPROM.

6. An input/output system comprising:
an input/output base unit which has a plurality of slots into which input/output modules are pluggable;
an evaluation device; and
at least one cover element which is arrangeable on one of the plurality of slots of the input/output base unit,
wherein the evaluation device is configured to check an occupancy of the plurality of the slots by input/output modules and a presence of the at least one cover element at a slot of the plurality of slots on a basis of configuration information.

7. The input/output system according to claim 6, wherein the evaluation device is configured to detect an absence of the at least one cover element at the slot defined on the basis of the configuration information.

8. The input/output system according to claim 6, wherein the evaluation device is configured to generate warning information in the absence of the at least one cover element at a defined slot and/or to cause a change in an operating mode of the input/output system.

9. An input/output system comprising:
an input/output base unit which has a plurality of slots into which input/output modules are pluggable;
an evaluation device; and
at least one cover element which is arrangeable on one of the plurality of slots of the input/output base unit,
wherein the at least one cover element comprises a locking device,
wherein the at least one cover element is arrangeable in a plug-in direction at an associated slot of the input/output base unit and, in an attached position, is locked to the input/output base unit by the locking device, and
wherein the evaluation device is configured to detect a presence of the at least one cover element at a slot of the plurality of slots.

10. The input/output system according to claim 9, wherein the at least one cover element has a housing wall, wherein the locking device has an actuating element arranged along an actuating direction on the housing wall and a locking element operatively connected to the actuating element and adjustably connected to the housing wall, and wherein the locking element is configured to, in the attached position, lock the at least one cover element to the input/output base unit and is adjustable in relation to the housing wall by adjusting the actuating element in the actuating direction in relation to the housing wall in an unlocking direction directed transversely to the actuating direction in order to release the locking.

11. The input/output system according to claim 10, wherein the locking element is formed in one piece with the housing wall.

12. The input/output system according to claim 10, wherein the actuating element is guided displaceably on the housing wall along the actuating direction.

13. The input/output system according to claim 10, wherein the at least one cover element is attachable to the input/output base unit in the plug-in direction, and wherein the actuating direction for unlocking the locking element is opposite the plug-in direction.

14. The input/output system according to claim 10, wherein the actuating element has at least one active section which is displaceably guided on at least one side edge of the locking element.

15. The input/output system according to claim 10, wherein the input/output base unit has a wall which is arranged on the slot and a latching section which is formed on the wall and with which the locking element is engaged for locking in the attached position of the at least one cover element.

* * * * *